Nov. 12, 1963   A. BOSSETTI   3,110,075
PASSAGE CONTINUOUS KILN FOR FIRING CERAMIC MATERIAL
Filed Aug. 14, 1961   3 Sheets-Sheet 1

INVENTOR
ADRIANO BOSSETTI
BY  *Irwin S. Thompson*
ATTORNEY

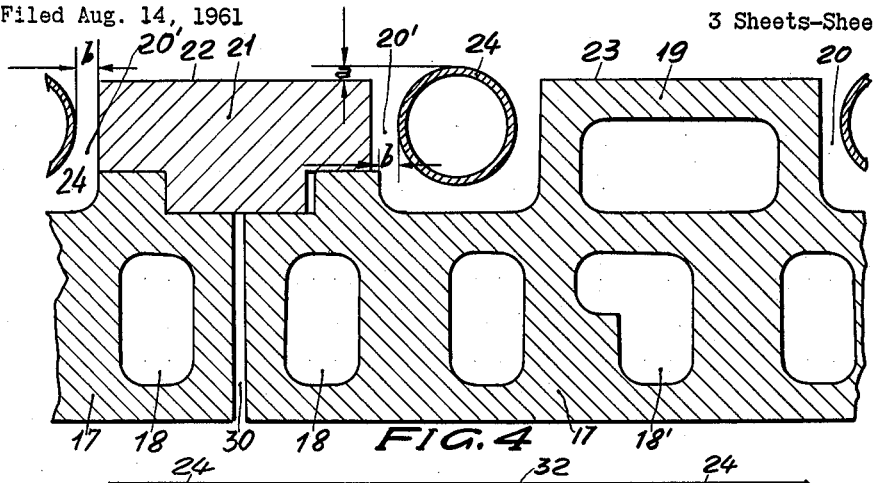
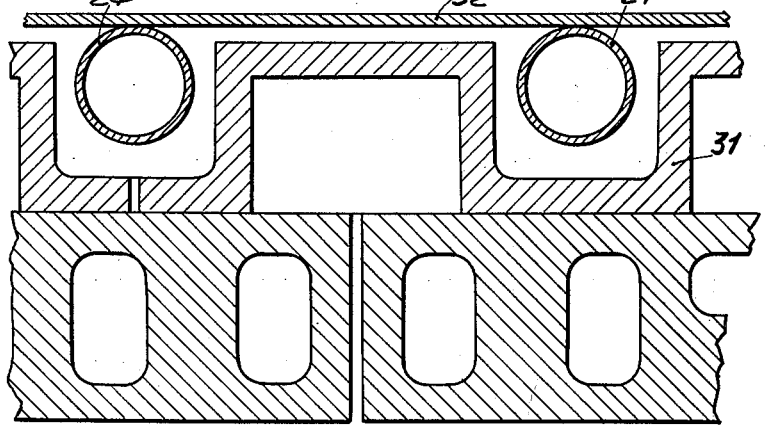
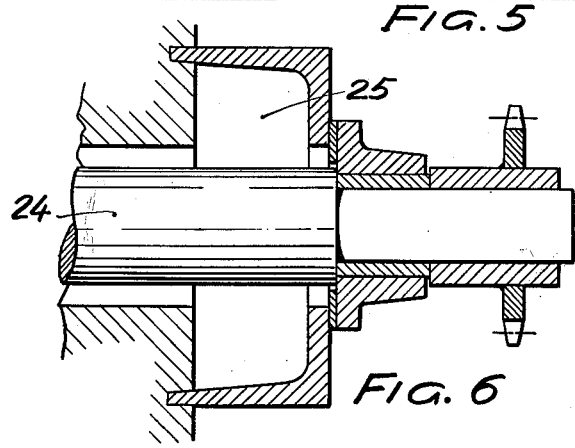

United States Patent Office 3,110,075
Patented Nov. 12, 1963

3,110,075
PASSAGE CONTINUOUS KILN FOR FIRING
CERAMIC MATERIAL
Adriano Bossetti, % Racheli & Bossi, Via Verri 6,
Milan, Italy
Filed Aug. 14, 1961, Ser. No. 131,132
Claims priority, application Italy May 24, 1961
11 Claims. (Cl. 25—142)

This invention relates to improvements in and to kilns for firing ceramic materials of any type.

Said kilns have one or more tunnels for firing the ceramic materials, each tunnel having a sole composed of two or more rollers with horizontal axes and parallel to one another, being driven mechanically from outside the tunnel or tunnels to bring about by their rotation, the advancement of plates made of refractory material or Carborundum, on which ceramic materials are placed to be fired.

One object of this invention is to provide a kiln of this general type in which troubles hitherto experienced in the types of kilns existing and known to date will be prevented, in particular, the falling and breakage of the said plates.

Another object of this invention is to ensure the continuity of the travel of the material passing through the firing tunnel, even if the plates supporting the ceramic materials should happen to break unexpectedly.

Another object of this invention is to make it possible to construct a kiln of the type described in the most efficient and economical way possible, using elements or blocks of refractory material, readily manufactured at moderate cost.

Another object of the invention is to make it possible to manufacture a kiln of the type described having two or more tunnels or chambers, in which the operating temperature and the flow of hot air in one of the tunnels will not interfere with the adjacent, vertical channels or tunnels, and in which the firing temperature curve can be controlled through the entire process.

Other objects and advantages of this invention will become apparent as the description proceeds, reference being made to the accompanying drawings, wherein:

FIG. 4 is an enlarged detail of one of the soles of the kiln, shown as a transverse section as in FIG. 1.

FIG. 5 is a detail similar to that shown in FIG. 4 of a different form of embodiment of the invention.

FIG. 6 is an enlarged detail of FIG. 3.

Figure 1:
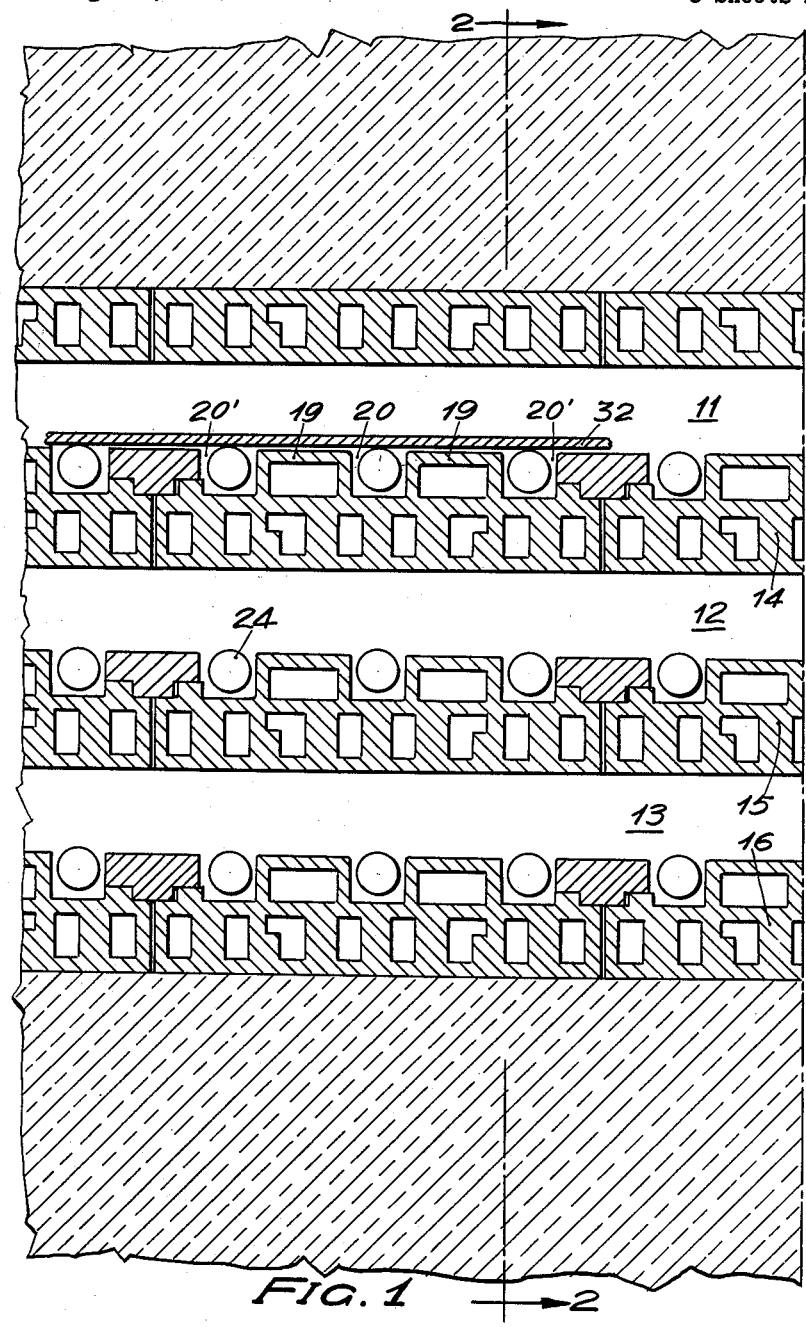
FIG. 1 is a longitudinal, vertical section of a longitudinal portion of a kiln embodying the invention, shown, for the sake of simplicity, as having three tunnels.
Figure 2:
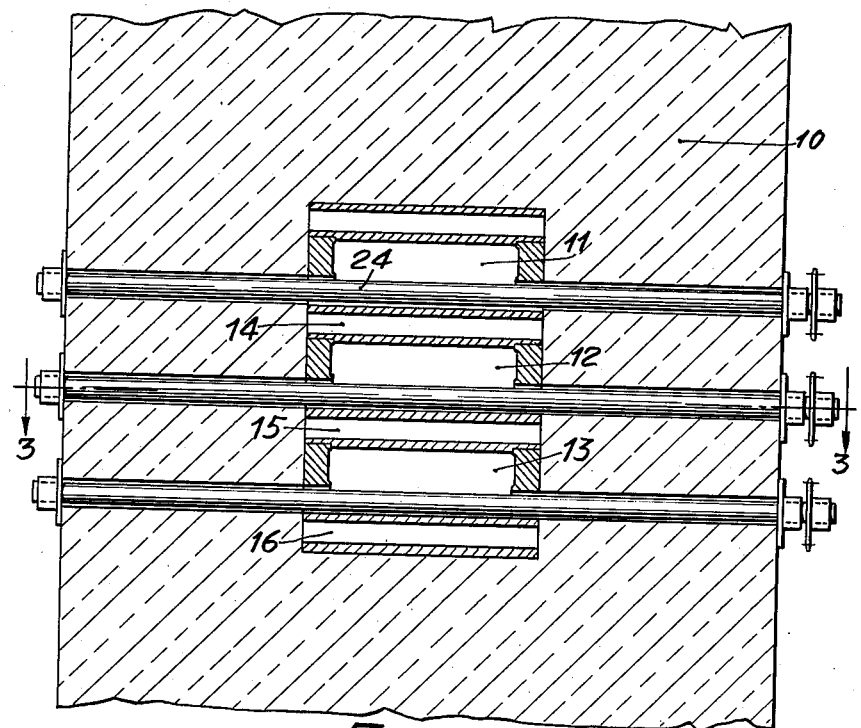
FIG. 2 is a transverse section of the kiln in FIG. 1, taken along the line 2—2.
Figure 3:
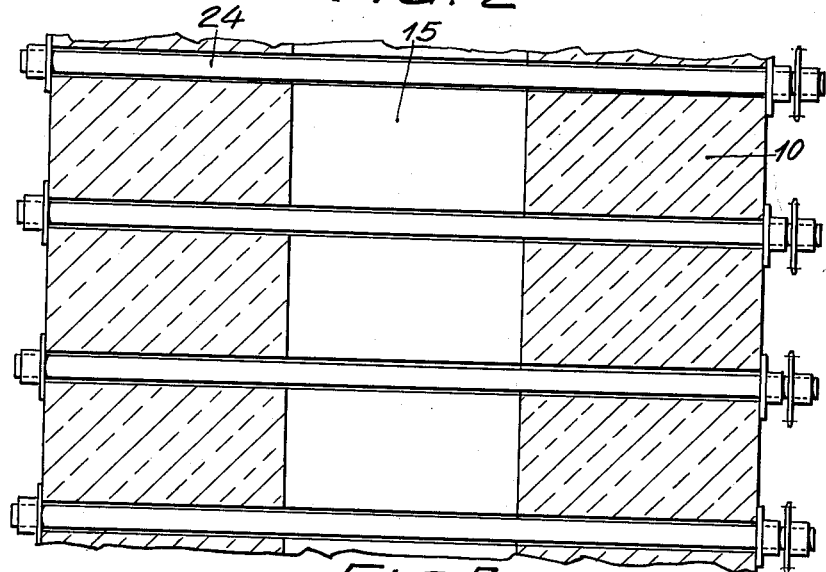
FIG. 3 is a plan view taken along line 3—3 in FIG. 2.

With reference to the above figures, 10 represents, generally, the outer masonrywork of the kiln, which does not play any part in the invention and is therefore not shown in detail. Tunnels 11, 12 and 13 are defined on the inside of the kiln, having, respectively, soles 14, 15 and 16. The number of tunnels may, of course, be other than three and any or all of the tunnels may be multiple, that is, suitably divided up into two or more parallel tunnels at the same level. All of these possible modifications, evident to a person expert in the field are not shown.

A description will be now given of one of the kiln's soles, specifically of sole 15 of tunnel 12 shown on an enlarged scale in FIG. 4, but the other, remaining soles have an idecintal structure and the following description applies also equally to them. The sole, itself, comprises a number of blocks or elements 17 which serve chiefly to house the electric heating elements. Blocks 17 are composed of suitable refractory material, of a type which may be chosen by persons expert in this technical field, depending on the temperature which must be reached and, which, for example, may be of sillimanite in the firing area. The heating elements are held in the crosswise holes 18 located in the lower portion of each block 17. Holes 18' having a slightly different shape are used to house a thermocouple along with a heating element.

The lower area of block 17 serves to form the roof of the underlying tunnel, when such a tunnel exists.

Each block has an upper part 19 which describes a channel 20 and leaves two other channels 20' open at its sides.

A limited amount of play, preferably on the order of a few millimeters, remains between any two adjacent blocks 17, indicated in the drawing as 30. A joint covering is provided at the joint between the two blocks 17 adjacent one another, said covering 21 being preferably of a massive piece of refractory material, so placed as to cover and close off gap 30, thereby preventing hot air or gas from passing between two tunnels of any one kiln which may be located one above the other, thus the operating temperatures and the flow of gases and the firing temperature curves remain isolated and undisturbed, even though suitable play is left between the two adjacent blocks 17.

The joint covering 21 has its upper surface 22 substantially at the same level as surface 23 of the upper part 19 of block 17 and thus serves to help create a side wall for one of channels 20' in each of the two blocks on either side.

Rollers 24 are housed in the channels 20 and 20', the rotation of which rollers causes the refractory plates, on which the material to be fired is located, to advance through the tunnel. Said rollers are preferably driven from the outside of the kiln by suitable mechanism of any known type, for example by sprockets driven, in turn, by a chain operated by a motor-speed reducer unit and said rollers are preferably cooled by air currents fed in by way of air-tight chambers 25 of the type more fully described in Patent No. 2,945,279 by the same applicant. The plates 32 which carry the material to be fired rest on rollers 24.

It has been found that in order to obtain a sure and satisfactory advancement of plate 32 one requires not only the combination of rollers and interspersed flat areas 19 and 21 in the sole of each kiln tunnel, but also that it is extremely desirable that certain dimensional relationship be established among the various parts. FIG. 4 shows, by the letter "a" the difference in level between flat surfaces 22 and 23 and the horizontal plane tangent to the protruding, cylindrical surface of rollers 24. This distance "a" will be called "the protrusion of the roller above the level part of the sole."

The letter "b" in FIG. 4 represents the distance between the vertical plane tangent to the outer surface of each roller and the vertical surface of the piece 19 or 21 alongside the roller and nearest to it; which is to say that "b" represents the difference between half the width of channel 20 or 20' and the radius of the roller found in said channel. This distance will be called "the side play of the rollers in the channel in which they are housed.

The distance between centers of two successive rollers is less than the length of the plate which carries the material to be fired, so that the rollers, when turning, can draw the plate along. But if the other dimensional relationship which will be presented further on are respected, even when a plate breaks and thus, when there is a piece of a plate which at a certain moment is not in contact with any roller, the material to be fired advancing through the tunnel will not be stopped but will continue to advance smoothly.

Specifically, the protrusion of the roller above the level part of the sole must not be less than 3 mm. nor more than 5 mm.; and, in addition, the ratio between said protrusion and the outside diameter of the rollers must fall between 1:13.5 and 1:8. The ratio between the outside diameter of the rollers and their distance between centers must fall between 1:3.5 and 1:4. Lastly, the side play of the rollers in the channels in which they are housed "$b$" should be not greater than 9 mm., nor less than 6 mm. and the ratio between it and the diameter of the rollers should fall between 1:4.5 and 1:6.7.

The play between two blocks 17 or clearance 30 should fall between 2 mm. and 4 mm.

In the specific example given, showing one preferred form of embodiment of the invention, block 17 helps to form two channels 20' and describes one channel 20, since the upper part of the block 19 is divided up between two portions. Longer or shorter blocks can be made, however, having only one upper part, or having more than two upper parts 19, which may thus define one, more than one, or no channels 20 in which rollers are housed, in addition to helping define two channels 20', together with joint covering 21 located between one block 17 and the adjacent block. Also in such a case, though, the dimensional relationships specified above remain good.

As shown in FIG. 5, the upper parts 19 of each block 17 may be so constructed as not to make up an integral part of the block itself, but may be composed of one or more individual pieces 31, applied to the upper part of the block and having, for example, the shape shown, in FIG. 5.

Widely varying modifications and adaptations may be made by persons expert in this technical field to the various embodiments of the invention described herein, without, however, falling outside the scope and coverage of the invention and the claims of this patent.

What I claim is:

1. A kiln for firing ceramics, comprising at least one firing tunnel, the sole of each firing tunnel comprising a plurality of adjacent refractory blocks housing therein electric heating elements, said blocks having upwardly projecting portions defining flat horizontal upper surfaces and having recesses between the aforementioned projecting portions forming channels transverse with respect to the tunnel, said sole further comprising rollers mounted substantially tangential to said upper surfaces within said recesses and rotatable about horizontal axes transverse to said tunnel for advancing the material to be fired, a major portion of said rollers being positioned below the level of the aforementioned flat horizontal upper surfaces and the uppermost portion of said rollers projecting slightly above said level.

2. A kiln for firing ceramics, comprising at least one firing tunnel, the sole of each firing tunnel comprising a plurality of adjacent refractory blocks housing therein electric heating elements, said refractory blocks being separated from one another by narrow interspaces transverse with respect to said tunnel, joint coverings positioned above said interspaces to seal the same, said joint coverings having flat upper horizontal surfaces and said blocks having upwardly projecting portions defining flat upper surfaces at the same level as the upper surfaces of said joint coverings, said joint coverings and said upwardly projecting portions of said blocks defining intercalated recesses transverse to the tunnel, said sole further comprising rollers mounted substantially tangential to said upper surfaces within said recesses and rotatable about horizontal axes transverse to said tunnel for advancing the material to be fired, a major portion of said rollers being positioned below the level of the aforementioned upper surfaces of said joint coverings and of said upwardly projecting portions of said blocks and the uppermost portion of said rollers projecting only slightly above said level.

3. A kiln for firing ceramics, comprising at least one firing tunnel, the sole of each firing tunnel comprising a plurality of adjacent refractory blocks housing therein electric heating elements, said blocks defining flat horizontal upper surfaces and intercalated recesses, said surfaces and recesses extending transversely of the tunnel, said sole further comprising rollers housed in said recesses with a lateral clearance of not less than 6 mm. and not more than 9 mm., said rollers being rotatable about horizontal axes transverse to said tunnel for advancing the material to be fired, and said rollers projecting above the level of the aforementioned upper surfaces by not less than 3 mm. and not more than 5 mm.

4. A kiln for firing ceramics, comprising at least one firing tunnel, the sole of each firing tunnel comprising a plurality of adjacent refractory blocks housing therein electric heating elements, said blocks defining flat horizontal upper surfaces and intercalated recesses, said surfaces and said recesses extending transversely of the tunnel, said kiln further comprising rollers housed in said recesses with a lateral clearance, the ratio of said lateral clearance to the diameter of said rollers being not less than 1:6.7 and not more than 1:4.5, said rollers being rotatable about horizontal axes transverse to said tunnel for advancing the material to be fired and having interaxial distances not less than 3.5 times and not more than 4.0 times the diameter of said rollers, said rollers projecting above the level of the aforementioned upper surfaces by an amount not less than $2/27$ and not more than $1/8$ the diameter of the rollers.

5. A continuous tunnel kiln for firing ceramic material transported therethrough upon load carrying plates comprising a plurality of adjacent tunnels each having a sole and a ceiling, each of said soles comprising a plurality of electric heating resistance housing blocks, a plurality of recessed seats located at the top horizontal surfaces of said blocks and oriented transversely with respect to the longitudinal axes of said tunnels, a plurality of rollers, each of said rollers rotatably mounted within a separate one of said recessed seats substantially tangential to said top horizontal surfaces but projecting slightly from the housing block, said rollers being spaced apart so that the distance between axes of adjacent rollers is less than the length of said load carrying plates, the portions of the upper surfaces of said housing blocks between said seats forming supports for said plates so that broken plates cannot obstruct said tunnels.

6. A continuous tunnel kiln for firing ceramic material transported therethrough upon load carrying plates, comprising in combination: a plurality of adjacent tunnels for heating said ceramic material, each of said tunnels containing a plurality of transverse roller means for driving said plates therethrough, a plurality of electric heating resistance housing blocks forming the base of said tunnels, said blocks having a plurality of bosses thereon, each boss being positioned intermediate adjacent ones of said roller means, the flat upper surfaces of said bosses being substantially tangential to the uppermost surfaces of said roller means, said bosses and said roller means together forming the respective soles of said tunnels so that broken plates seat on said bosses and cannot jam said roller means.

7. A tunnel for a ceramic firing kiln through which said ceramic is transported on load carrying plates, comprising a ceiling, a plurality of transverse driving rollers for driving said plates, and a plurality of support means interposed between adjacent rollers, said support means having flat horizontal surfaces positioned substantially tangential to the upper surfaces of said rollers to form therewith the sole of said tunnel whereby broken plates cannot obstruct said tunnel.

8. Kiln as in claim 1, in which each sole comprises a number of adjacent blocks, separated from one another by clearance forming an interspace between blocks extending crosswise inside the kiln, with a joint covering being placed over each interspace, cutting off all communication between each tunnel and any other vertically adjacent tunnel.

9. Kiln as in claim 8, in which the clearance or interspace between each pair of adjacent blocks falls between 2 mm. and 4 mm.

10. Kiln as in claim 1, in which each block is composed of a lower portion and at least one separate and distinct piece applied above said lower part, to define the upper flat surface and the channels in which the rollers are seated.

11. Kiln as in claim 1, in which the blocks of the sole of one tunnel serve as the roof of the underlying tunnel.

References Cited in the file of this patent

UNITED STATES PATENTS

| | | |
|---|---|---|
| 1,348,486 | Dressler | Aug. 3, 1920 |
| 1,425,499 | Lewis | Aug. 8, 1922 |
| 1,818,154 | Nobbe | Aug. 11, 1931 |
| 1,965,832 | Hartford et al. | July 10, 1932 |
| 2,504,440 | Miess | Apr. 18, 1950 |
| 2,945,279 | Bossetti | July 19, 1960 |